United States Patent Office 2,917,505
Patented Dec. 15, 1959

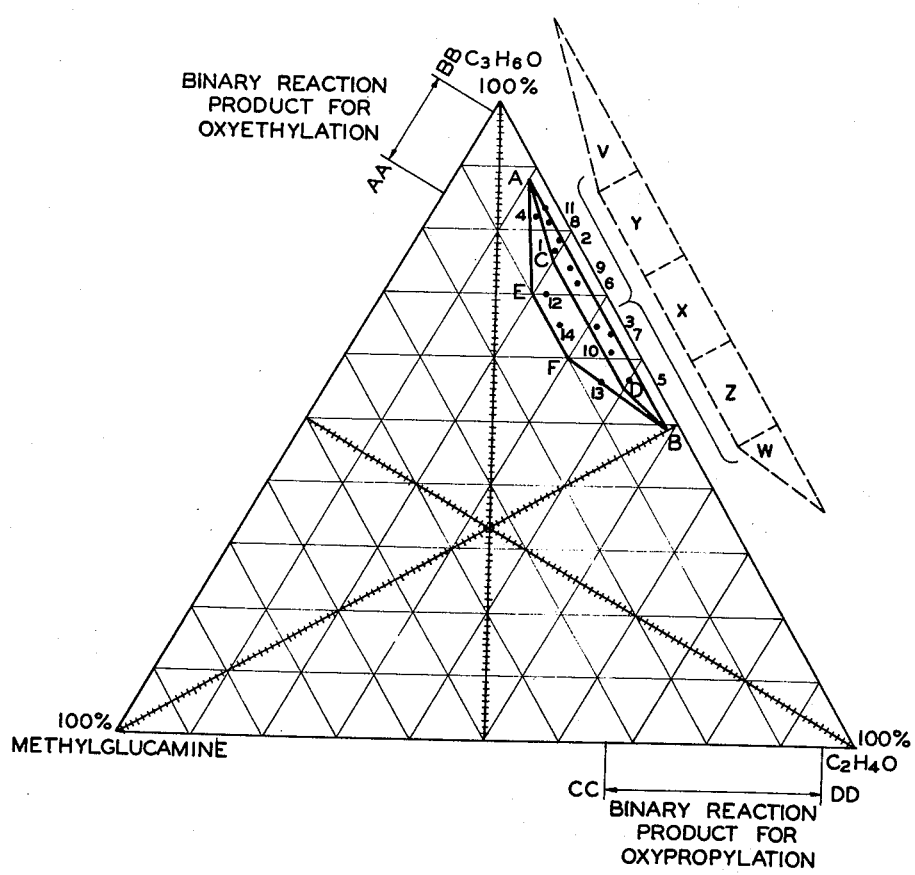

2,917,505

CERTAIN OXYALKYLATED N-METHYL GLUCAMINES AND METHOD OF MAKING SAME

Melvin de Groote, St. Louis, and Owen H. Pettingill, Kirkwood, Mo., assignors to Petrolite Corporation, Wilmington, Del., a corporation of Delaware Original application August 10, 1954, Serial No. 448,923. Divided and this application April 10, 1957, Serial No. 651,851

7 Claims.  (Cl. 260—211)

This application is a division of our copending application Serial No. 448,923, filed August 10, 1954, now Patent No. 2,888,404.

Our invention is concerned with new chemical products or compounds useful as demulsifying agents in processes or procedures particularly adapted for preventing, breaking or resolving emulsions of the water-in-oil type and particularly petroleum emulsions. Our invention is also concerned with the application of such chemical products or compounds in various other arts and industries as well as with methods of manufacturing the new chemical products or compounds which are of outstanding value in demulsification.

More specifically then, the present invention is concerned with a cogeneric mixture of a homologous series of glycol ethers of N-methylglucamine. The cogeneric mixture is derived exclusively from N-methylglucamine, propylene oxide and ethylene oxide in such weight proportions so the average composition of said cogeneric mixture stated in terms of initial reactants lies approximately within the trapezoid of the accompanying drawing in which the minimum N-methylglucamine content is at least 1.75% and which trapezoid is identified by the fact that its area lies within the straight lines connecting A, B, F, E. Our preference by far is to use the compositions which represent less than one-half of this total area, to wit, the smaller trapezoid A, B, D, C. Reference to methylglucamine means N-methylglucamine in all instances.

It is immaterial as to whether one reacts the amine with propylene oxide first and then with ethylene oxide, or with ethylene oxide and then with propylene oxide; or, for that matter, one may employ a mixture of the two oxides; or, if desired, one may add a small amount of ethylene oxide, then propylene oxide, and then more ethylene oxide.

Referring to the hereto attached drawing it is simplified by noting that one may react methylglucamine with enough ethylene oxide so the binary reaction product falls within the mixture identified by the line CC—DD on the extremity of the graph which shows combinations derived solely from methylglucamine and ethylene oxide. After obtaining such binary reaction product it can then be reacted with propylene oxide so as to bring it within the area of the trapezoid A, B, F, E, or preferably within the smaller trapezoid A, B, D, C.

Similarly, one can produce a binary reaction product from methylglucamine and propylene oxide as identified by the comparable line AA—BB and subject this reaction product to oxyethylation so as to bring the composition within the area of the trapezoid and preferably within the area of the small trapezoid A, B, D, C.

The products of the present invention are also useful for various purposes other than the resolution of petroleum emulsions of the water-in-oil type.

The new products are useful as wetting, detergent and leveling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles, such as sewage, coal washing waste water, and various trade wastes and the like; as germicides, insecticides, emulsifying agents as, for example, for cosmetics, spray oils, water-repellent textile finishes; as lubricants, etc.

For the purpose of resolving petroleum emulsions of the water-in-oil type, and also for that matter for numerous other purposes where surface-active materials are effective, and particularly for those uses specified elsewhere herein, we prefer to employ oxyalkylated derivatives, which are obtained by the use of monoepoxides, in such manner that the derivatives so obtained have sufficient hydrophile character to meet at least the test set forth in U.S. Patent No. 2,499,368, dated March 7, 1950, to De Groote and Keiser. In said patent such test for emulsification using a water-insoluble solvent, generally xylene, is described as an index of surface activity.

The above mentioned test, i.e., a conventional emulsification test, simply means that the preferred product for demulsification is soluble in a solvent having hydrophobe properties or in an oxygenated water insoluble or even a fraction of a water-soluble hydrocarbon solvent and that when shaken with water the product may remain in the nonaqueous solvent or, for that matter, it may pass into the aqueous solvent. In other words, although it is xylene soluble, for example, it may also be water soluble to an equal or greater degree.

For purpose of convenience, what is said hereinafter will be divided into four parts:

Part 1 is concerned with the oxyalkylation of N-methylglucamine in a general way;

Part 2 is concerned with the oxyalkylation of N-methylglucamine using two different oxides, i.e., propylene oxide and ethylene oxide so as to produce derivatives falling within said compositional limits as previously described and noted hereinafter in detail;

Part 3 is concerned with the resolution of petroleum emulsions of the water-in-oil type by means of the previously described chemical compounds; and Part 4 is concerned with uses for the products herein described either as such or after modification, including applications other than those involving the resolution of petroleum emulsions of the water-in-oil type.

PART 1

The oxyalkylation of amines is well known. This applies particularly to reactions involving monoepoxides having not over 4 carbon atoms, such as ethylene oxide and propylene oxide. As to the oxyalkylation of a monoamine such as cyclohexylamine, see U.S. Patent No. 2,626,922, dated January 27, 1953, to De Groote. As to the oxyalkylation of a polyamine, see U.S. Patent No. 2,552,530, dated May 15, 1951, to De Groote.

The oxyalkylation of an amine is comparable to other well known oxyalkylations and under certain conditions may require variation. There is no problem if the amine is a liquid or if it is xylene-soluble or soluble in an equivalent solvent, or can be melted and reacted at the melting point. In the case of methylglucamine the product is a solid and one of the most satisfactory procedures is to use a slurry of the finely powdered material in xylene comparable to the oxyalkylation of sorbitol. As to this procedure, see Example A in U.S. Patent No. 2,552,528, dated May 15, 1951, to De Groote. Since methylglucamine melts at 128°–129° C. it is obvious that although one starts with a solid that the product is a liquid at the reaction temperatures employed in the majority of instances.

In order to illustrate why the herein contemplated compounds or said products are cogeneric mixtures and not single chemical compounds, and why they must be described in terms of manufacture, and molal ratio or percentage ratio of reactants, reference is made to a monohydric alcohol. Methylglucamine is a polyhydric alcohol having 5 reactive hydrogen atoms attached to oxygen and also one attached to nitrogen. Thus, for the present purpose it might be considered the same as an amino alcohol having 6 hydroxyl radicals. However, for the moment, one can forget the hydrogen atom attached to nitrogen and even the plurality of hydroxyl radicals and simply consider what happens when a monohydric alcohol is subjected to oxyalkylation.

If one selects any hydroxylated compound and subjects such compound to oxyalkylation, such as oxyethylation or oxypropylation, it becomes obvious that one is really producing a polymer of the alkylene oxide except for the terminal group. This is particularly true where the amount of oxide added is comparatively large, for instance ,10, 20, 30, 40, or 50 units. If such a compound is subjected to oxyethylation so as to introduce 30 units of ethylene oxide, it is well known that one does not obtain a single constituent which, for sake of convenience, may be indicated as $RO(C_2H_4O)_{30}H$. Instead, one obtains a cogeneric mixture of closely related homologous compounds in which the formula may be shown as the following: $RO(C_2H_4O)_nH$, wherein $n$, as far as the statistical average goes, is 30, but the individual members present in significant amount may vary from instances where $n$ has a value of 25 and perhaps less, to a point where $n$ may represent 35 or more. Such mixture is, as stated, a cogeneric closely related series of touching homologous compounds. Considerable investigation has been made in regard to the distribution curves for linear polymers. Attention is directed to the article entitled "Fundamental Principles of Condensation Polymerization," by Paul J. Flory, which appeared in Chemical Reviews, volume 39, No. 1, page 137.

Unfortunately, as has been pointed out by Flory and other investigators, there is no satisfactory method, based on either experimental or mathematical examination, of indicating the exact proportion of the various members of touching homologous series which appear in cogeneric condensation products of the kind described. This means that from the practical standpoint, i.e., the ability to describe how to make the product under consideration and how to repeat such production time after time without difficulty, it is necessary to resort to some other method of description.

What has been said in regard to a monohydric compound of course is multiplied many times in the case of a polyhydric compound such as methylglucamine.

Although acid catalysts are used in oxyalkylations they are used to a lesser extent in the oxyalkylations of basic amines and the like. Under such circumstances one may have to use enough of the acidic catalyst to neutralize the basicity of the product and convert into a salt. This is not true where certain clays or prepared earths are used which act as acidic catalysts. In any event, it is our preference to use basic catalysts such as caustic soda, sodium methylate, or the like.

PART 2

The oxyalkylation of an amine, particularly a primary amine or secondary amine or a hydroxylated amine regardless of whether it is primary, secondary, or tertiary is comparatively simple and has been described repeatedly in the literature. If the product is a liquid such as triethanolamine one can proceed to treat with an alkylene oxide such as ethylene oxide, propylene oxide, or butylene oxide, at least in the early stages if desired without adding any catalyst. Generally speaking, if oxyalkylation is rather extensive as in the present instance, one requires a catalyst after the initial stage and it is just as simple to add it from the very beginning. If the amine is a solid at ordinary temperature and this is true in regard to methylglucamine, one can readily follow the procedure of using a slurry in the same manner that is employed in connection with other solids although not necessarily nitrogen-containing. Reference is made to products such as sorbitol, sucrose, glucose, pentaerythritol, dipentaerythritol, etc. As previously pointed out methylglucamine is apt to be a liquid at the reaction temperature which usually is above the melting point.

Specific reference is made to the instant application which is concerned with ethylene oxide, and propylene oxide, or the equivalents. Actually, whether one uses ethylene oxide or butylene oxide or, for that matter, propylene oxide, one preferably starts with either the powdered solid suspended as a slurry in xylene or a similar inactive solvent; or one employs an alkylene carbonate such as ethylene carbonate, butylene carbonate, or propylene carbonate, for the initial oxyalkylation. When such initial oxyalkylation has gone far enough to convert the solid mass into a product which is at least liquid at oxyalkylation temperature it can be subjected to the oxides as differentiated from the carbonates. The carbonates, of course, cost more than the oxides.

In any event, any one of a number of well known procedures may be employed and reference has been made to U.S. Patent No. 2,652,394 dated September 15, 1953, to De Groote. This particular patent happens to be concerned with sucrose but, as a matter of fact, one can just as readily substitute methylglucamine and the reaction will go just as rapidly and, in fact, perhaps more rapidly than with sucrose. Referring to said aforementioned patent, the same procedure using propylene oxide, or ethylene oxide, can be employed simply using mixed oxides instead.

It is not believed any examples are necessary to illustrate such well known procedure but for purpose of illustration the following are included:

*Example 1a*

The reaction vessel employed was a stainless steel autoclave with the usual devices for heating, heat control, stirrer, inlet, outlet, etc., which is conventional in this type of apparatus. The capacity was approximately 4 liters. The stirrer operated at a speed of approximately 250 r.p.m. There were charged into the autoclave 500 grams of methylglycamine, 300 grams of xylene, and 15 grams of sodium methylate. The autoclave was sealed, swept with nitrogen gas and stirring started immediately and heat applied. The temperature was allowed to rise to approximately 152° C. At this particular time the addition of propylene oxide was stated. Propylene oxide was added continuously at such speed that it was absorbed by the reaction as added. The amount added in this operation was 1500 grams. The time required to add the propylene oxide was two hours. During this period the temperature was maintained at 135° to 150° C., using cooling water through the inner coils when necessary and otherwise applying heat if required. The maximum pressure during the reaction was 50 pounds per square inch. Ignoring the xlyene and sodium methylate and considering only the methylglucamine for convenience, the resultant product represents 3 parts by weight of propylene oxide to one part by weight of methylglucamine. The xylene present represented approximately .6 of one part by weight.

*Example 2a*

The reaction mass was transferred to a larger autoclave (capacity 15 liters). Without adding any more solvent or any more xylene the procedure was repeated so as to add another 1500 grams of propylene oxide under substantially the same operating conditions but requiring about 3 hours for the addition. At the end of this step the ratio represented approximately 6 to 1 (ratio propylene oxide to methylglucamine).

*Example 3a*

In a third step, instead of adding 1500 grams of propylene oxide, 1625 grams were added. The reaction slowed up and required approximately 6 hours, using the same operating temperatures and pressures. The ratio at the end of the third step was 9.25 parts by weight of propylene oxide per weight of methylglucamine.

*Example 4a*

At the end of this step the autoclave was opened and an additional 5 grams of sodium methylate added, the autoclave flushed out as before, and the fourth and final oxyalkylation completed, using 1625 grams of propylene oxide, and the oxyalkylation was complete within 3¼ hours using the same temperatures range and pressure as previously. At the end of the reaction the product represented approximately 12.5 parts of propylene oxide by weight to one part of methylglucamine.

Having obtained oxypropylated methylglucamine the products were subjected to oxyethylation in a manner comparable to the oxyethylation of triethanolamine, or for that matter, in the same way that oxypropylated sucrose is subjected to oxyethylation in the manner described in U.S. Patent No. 2,652,394, dated September 15, 1953, to De Groote. Indeed, the procedure is comparatively simple for the reason that one is working with a liquid and also that ethylene oxide is more reactive than propylene oxide. As a result, using the same amount of catalyst one can oxyethylate more rapidly than usually at a lower pressure.

The same procedure using a slurry of methylglucamine in xylene was compiled in connection with ethylene oxide and the same mixture on a percentage basis was obtained as in the above examples where propylene oxide and methylglucamine were used. Note what has been said previously as to the melting point of methylglucamine.

In the preceding procedures one oxide has been added and then the other. One need not follow this procedure. The two oxides can be mixed together in suitable proportions and subsequently subjected to joint oxyalkylation so as to obtain products coming within the specified limits. In such instances, of course, the oxyalkylation may be described as random oxyalkylation insofar that one cannot determine the exact location of the propylene oxide or ethylene oxide groups. In such instances the procedure again is identically the same as previously described and, as a matter of fact, we have used such methods in connection with methylglucamine.

Actually, methylglucamine at times may contain a trace of moisture. Our preference is to prepare the slurry with an excess of xylene and distill off a part of the xylene so as to remove any trace of water and then flush out the mass with nitrogen. Even so, there may be a few tenths of a percent of moisture remain although at times examination indicates at the most it is merely a trace.

As previously pointed out the simplest procedure of all is to prepare a binary reaction product of ethylene oxide on the one hand or methylglucamine and propylene oxide on the other hand, and react with the other oxide. Note line CC—DD which indicates that in the binary reaction product obtained from methylglucamine and ethylene oxide one employs approximately 66.6% to 96.5% of ethylene oxide and approximately 3.5% to 33.4% of methylglucamine.

Similarly, if one refers to the line AA—BB it means one would employ from 1.95% of methylglucamine up to 14.3% of methylglucamine and from 85.7% of propylene oxide up to 98.05% of propylene oxide.

Actually, in other operations we have proceeded to do as follows: Mixed the methylglucamine with an aromatic petroleum solvent and with powdered caustic soda. We have stirred this mixture at 125° to 130° C. for a short period of time, approximately one-half hour, flushed out with nitrogen, and then subjected to vacuum so as to eliminate any moisture. We then started to oxypropylate and continued until oxypropylation was complete and then immediately followed with ethylene oxide. In these examples the amount of materials used are indicated in pounds, and in each instance, of course, a suitable size autoclave was used. Although the oxyalkylation started under vacuum the maximum pressure at any time was about 10 to 15 pounds. An efficient agitating device was used and stirring speed was approximately 350 r.p.m. These data covering nine oxyalkylations are included in Table I, immediately following. The time periods are shown. Incidentally, we have repeated these same operations using ethylene oxide first and then propylene oxide and we have also mixed the two oxides and completed the same nine oxyalkylations under substantially the same conditions.

TABLE I

| Ex. Nos. | Methyl-glucamine, lbs. | High-Boiling Aromatic Petroleum Solvent | Caustic Soda, lbs. | Propylene Oxide, Lbs. | Ethylene Oxide, Lbs. | Time, Hrs. | Temp., °C. | Max. Press., lbs. per sq. in. |
|---|---|---|---|---|---|---|---|---|
| 1a | 10.0 | 8.57 | 1.3 | 162.9 | 40.2 | 10.5 | 125–130 | 10–15 |
| 2a | 7.4 | 6.26 | 1.07 | 159.9 | 37.0 | 9.75 | 125–130 | 10–15 |
| 3a | 4.52 | 3.79 | .66 | 97.4 | 45.2 | 9.0 | 125–130 | 10–15 |
| 4a | 6.28 | 5.32 | 1.0 | 184.1 | 31.4 | 12.0 | 125–130 | 10–15 |
| 5a | 2.0 | 1.7 | .3 | 43.3 | 30.2 | 4.50 | 125–130 | 10–15 |
| 6a | 3.95 | 3.35 | .6 | 115.9 | 39.5 | 9.25 | 125–130 | 10–15 |
| 7a | 1.8 | 1.5 | .3 | 53.1 | 17.2 | 4.50 | 125–130 | 10–15 |
| 8a | 1.37 | 1.17 | .1 | 51.86 | 10.5 | 4.0 | 125–130 | 10–15 |
| 9a | 1.06 | .9 | .08 | 40.1 | 12.6 | 4.0 | 125–130 | 10–15 |

Referring again to the ratio of the initial reactants based on the trapezoid in attached drawing it will be noted that we have calculated the percentage of the three initial reactants for the points A, B, C, D, E, and F, and Nos. 1 through 14, inclusive. We have also calculated initial binary mixtures corresponding in essence to the lines CC—DD and AA—BB, all of which appears in self-explanatory form in Table II, immediately following.

TABLE II

| Points on Boundary of Area | Tertiary Mixture, Percent Basis | | | Binary Intermediate Mixtures, Percent Basis | | | |
|---|---|---|---|---|---|---|---|
| | Methyl-glucamine | Propylene Oxide | Ethylene Oxide | Methyl-glucamine | Propylene Oxide | Methyl-glucamine | Ethylene Oxide |
| A | 1.75 | 88.25 | 10.0 | 1.95 | 98.05 | 14.9 | 85.1 |
| B | 1.75 | 50.0 | 48.25 | 3.38 | 96.62 | 3.5 | 96.5 |
| C | 5.0 | 75.0 | 20.0 | 6.24 | 93.76 | 20.0 | 80.0 |
| D | 5.0 | 55.0 | 40.0 | 8.32 | 91.68 | 11.1 | 88.9 |
| E | 10.0 | 70.0 | 20.0 | 12.5 | 87.5 | 33.4 | 66.6 |
| F | 10.0 | 60.0 | 30.0 | 14.3 | 85.7 | 25.0 | 75.0 |
| 1 | 4.72 | 76.4 | 18.88 | 5.8 | 94.2 | 20.0 | 80.0 |
| 2 | 3.62 | 78.3 | 18.15 | 4.42 | 95.58 | 13.1 | 86.9 |
| 3 | 3.07 | 66.3 | 30.63 | 4.43 | 95.57 | 9.1 | 90.9 |
| 4 | 2.84 | 83.0 | 14.16 | 3.51 | 96.49 | 16.7 | 83.3 |
| 5 | 2.66 | 57.5 | 39.84 | 4.42 | 95.58 | 6.25 | 93.75 |
| 6 | 2.48 | 72.6 | 24.92 | 3.3 | 96.7 | 9.04 | 90.96 |
| 7 | 2.21 | 64.7 | 33.09 | 3.3 | 96.7 | 6.26 | 93.74 |
| 8 | 2.16 | 81.5 | 16.54 | 2.58 | 97.42 | 11.55 | 88.45 |
| 9 | 1.97 | 74.5 | 23.53 | 2.58 | 97.42 | 7.73 | 92.27 |
| 10 | 4.0 | 61.0 | 35.0 | 6.17 | 93.83 | 10.28 | 89.72 |
| 11 | 1.8 | 83.0 | 16.0 | 2.12 | 97.88 | 10.1 | 89.9 |
| 12 | 7.0 | 70.0 | 23.0 | 9.1 | 89.9 | 23.35 | 76.65 |
| 13 | 8.0 | 57.0 | 35.0 | 12.3 | 87.7 | 18.6 | 81.4 |
| 14 | 9.0 | 65.0 | 26.0 | 12.15 | 87.85 | 25.7 | 74.3 |

As previously pointed out, the oxyalkylation of methylglucamine or similar hydroxylated polyamines has been described in the literature and is described also in detail above. All one need do is employ such conventional oxyalkylation procedure to obtain products corresponding to the compositions as defined. Attention is again directed to the fact that one need not add the entire amount of either oxide at one time but that a small portion of one could be added and then another small portion of the other, and the process repeated.

For purpose of illustration we have prepared examples in three different ways corresponding to the compositions on the drawing. In the first series propylene oxide and ethylene oxide were mixed; this series is indicated as Aa, Ba, etc., through and including 14a; in the second series propylene oxide was used first followed by ethylene oxide and this series is indicated as Ab, Bb, etc., through and including 14b; and finally in a third series, ethylene oxide was used first followed by propylene oxide and this series is indicated as Ac, Bc, etc., through and including 14c.

TABLE III

| Composition Corresponding to Following Point | Composition Where Oxides Are Mixed Prior to Oxyalkylation | Composition Where Propylene Oxide Used First Followed by Ethylene Oxide | Composition Where Ethylene Oxide Used First Followed by Propylene Oxide |
|---|---|---|---|
| A | Aa | Ab | Ac |
| B | Ba | Bb | Bc |
| C | Ca | Cb | Cc |
| D | Da | Db | Dc |
| E | Ea | Eb | Ec |
| F | Fa | Fb | Fc |
| 1 | 1a | 1b | 1c |
| 2 | 2a | 2b | 2c |
| 3 | 3a | 3b | 3c |
| 4 | 4a | 4b | 4c |
| 5 | 5a | 5b | 5c |
| 6 | 6a | 6b | 6c |
| 7 | 7a | 7b | 7c |
| 8 | 8a | 8b | 8c |
| 9 | 9a | 9b | 9c |
| 10 | 10a | 10b | 10c |
| 11 | 11a | 11b | 11c |
| 12 | 12a | 12b | 12c |
| 13 | 13a | 13b | 13c |
| 14 | 14a | 14b | 14c |

The products obtained by the above procedure usually show some color varying from a light amber to a pale straw. They can be bleached in the usual fashion using bleaching clays, charcoal, or an organic bleach, such as peroxide or peracetic acid, or the like.

There are certain variants which can be employed without detracting from the metes and bounds of the invention, but for all practical purposes there is nothing to be gained by such variants and the result is merely increased cost. For instance, any one of the two oxides can be replaced to a minor percentage and usually to a very small degree, by oxide which would introduce substantially the same group along with a side chain, for instance, one could employ glycidyl methyl ether, glycidyl ethyl ether, glycidyl isopropyl ether, glycidly butyl ether or the like.

In the hereto appended claims reference has been made to "glycol ethers of methylglucamine." Actually it well may be that the products should be referred to as "polyol ethers of methylglucamine" in order to emphasize the fact that the final products of reaction have more than two hydroxyl radicals. However, the products may be considered as hypothetically derived by reaction of methylglucamine with the glycols, such as ethylene glycol, butylene glycol, propylene glycol, or polyglycols. For this reason there seems to be a preference to use the terminology "glycol ethers of methylglucamine."

PART 3

As to the use of conventional demulsifying agents, reference is made to U.S. Patent No. 2,626,929, dated January 7, 1953, to De Groote, and particularly to Part 3. Everything that appears therein applies with equal force and effect to the instant process, noting only that where reference is made to Example 13b in said text beginning in column 15 and ending in column 18, reference should be to Example 5b herein described.

PART 4

The compounds derived in the manner described may be used as such for breaking petroleum emulsions of the water-in-oil type. They also can be converted into derivatives of the kind subsequently described which also may be used for this same purpose. Such derivatives are useful for other purposes including the same purpose for which the herein described products are effective. The herein described products may be used for various purposes where detergents, common solvents, emulsifiers, and the like are used. They may be used as lubricants and as additives to fluids used in hydraulic brake systems; they may be used as emulsifying agents to emulsify or remove greases or dirt; they may be used in the manufacture of a variety of other materials such as soluble oils, insecticide sprays, etc.

These products may be combined with a variety of reactants as chemical intermediates, for instance, with various diepoxides or polyepoxides. They may be combined with a number of other monoepoxides, such as epichlorohydrin, styrene oxide, glycide and methylglycide. They may be reacted with allyl glycidyl ether, glycidyl isopropyl ether, and glycidyl phenyl ether.

Furthermore, such products may be reacted with alkylene imines, such as ethylene imine or propylene imine, to produce cation-active materials. Instead of an imine, one may employ what is a somewhat equivalent material, to wit, a dialkylaminoepoxypropane of the structure

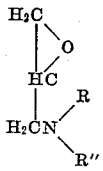

wherein R' and R" are alkyl groups.

The products may be combined with carboxy acids such as higher fatty acids so as to change their characteristics or with polycarboxy acids, such as diglycolic, maleic acid, phthalic acid, succinic acid, and the like, to give resins, soft polymers, or fractional esters which are essentially monomeric. Such products and others herein described, may all be used for the resolution of petroleum emulsions of the water-in-oil type. The products without further reaction are particularly valuable as additives for lubricating oils which are derived from sources other than petroleum.

The herein described products and the derivatives thereof are particularly valuable in flooding processes for recovery of oil from subterranean oil-bearing strata when employed in the manner described in U.S. Patent No. 2,233,381, dated February 25, 1941, to De Groote and Keiser.

In a trapezoid such as A, B, D, C, the area can be divided conveniently into five portions by first drawing two lines from the shorter of the two parallel sides perpendicular so as to intersect the other longer parallel line in two places, thus dividing the trapezoid into two triangles and a rectangle. The rectangle then obviously can be divided into three portions of the same size by drawing two additional lines, all of which is shown in the drawing on a larger scale and in dotted lines only. In the hereto attached claims the area within the upper apex of the trapezoid refers to the area within such upper triangle the area within the lower apex of the trapezoid refers to such lower triangle. The area in the center of the trapezoid refers to the area defined by the middle rectangle. The area of one rectangle is defined by being between the upper apex and the center rectangle, and the other by being between the lower apex and the center rectangle, all of which is perfectly plain by reference to the drawing. An attempt to draw additional lines and to number them in the same trapezoid A, B, D, C, would only tend towards confusion and thus the present means is being employed to point out the various areas which, in turn, appear in the sub-generic claims hereto appended. Thus in the drawing, the area designated V corresponds to the area within the upper triangle, the area W corresponds to the area within the lower triangle, the area X corresponds to that of the middle rectangle, and the areas Y and Z correspond to those of the other rectangles.

Having thus described our invention what we claim as new and desire to obtain by Letters Patent is:

1. The cogeneric mixture of a homologous series of glycol ethers of N-methylglucamine; said cogeneric mixture being derived exclusively from N-methylglucamine, propylene oxide and ethylene oxide in such weight proportion so the average compositions of said cogeneric mixture stated in terms of initial reactants lies approximately within the trapezoid of the accompanying drawing in which the minimum N-methylglucamine content is at least 1.75% and which trapezoid is identified by the fact that its area lies within the straight lines A, B, F, E.

2. The cogeneric mixture of a homologous series of glycol ethers of N-methylglucamine; said cogeneric mixture being derived exclusively from N-methylglucamine, propylene oxide and ethylene oxide in such weight proportion so the average compositions of said cogeneric mixture stated in terms of initial reactants lies approximately within the trapezoid of the accompanying drawing in which the minimum N-methylglucamine content is at least 1.75% and which trapezoid is identified by the fact that its area lies within the straight lines A, B, D, C.

3. The cogeneric mixture of claim 2 with the proviso that the reactant composition approximates a point in the area corresponding with V within the upper apex of the trapezoid A, B, D, C.

4. The cogeneric mixture of claim 2 with the proviso that the reactant composition approximates a point in the area corresponding with W within the lower apex of the trapezoid A, B, D, C.

5. The cogeneric mixture of claim 2 with the proviso that the reactant composition approximates a point in the area corresponding with X of the central part of the trapezoid A, B, D, C.

6. The cogeneric mixture of claim 2 with the proviso that the reactant composition approximates a point in the area corresponding with Y between the central part of the trapezoid A, B, D, C, and the upper apex.

7. The cogeneric mixture of claim 2 with the proviso that the reactant composition approximates a point in the area corresponding with Z between the central part of the trapezoid A, B, D, C, and the lower apex.

References Cited in the file of this patent

UNITED STATES PATENTS

| | | |
|---|---|---|
| 2,489,310 | Moss | Nov. 29, 1949 |
| 2,574,541 | De Groote et al. | Nov. 13, 1951 |
| 2,813,092 | Zech | Nov. 12, 1957 |